April 8, 1924.

F. AUCREMANNE

ROTATING GLASS MOLDING DEVICE

Filed June 8, 1921   2 Sheets-Sheet 1

1,489,729

FRANK AUCREMANNE   INVENTOR.

BY

G. H. Duthie

ATTORNEY.

April 8, 1924.
F. AUCREMANNE
1,489,729
ROTATING GLASS MOLDING DEVICE
Filed June 8, 1921   2 Sheets-Sheet 2
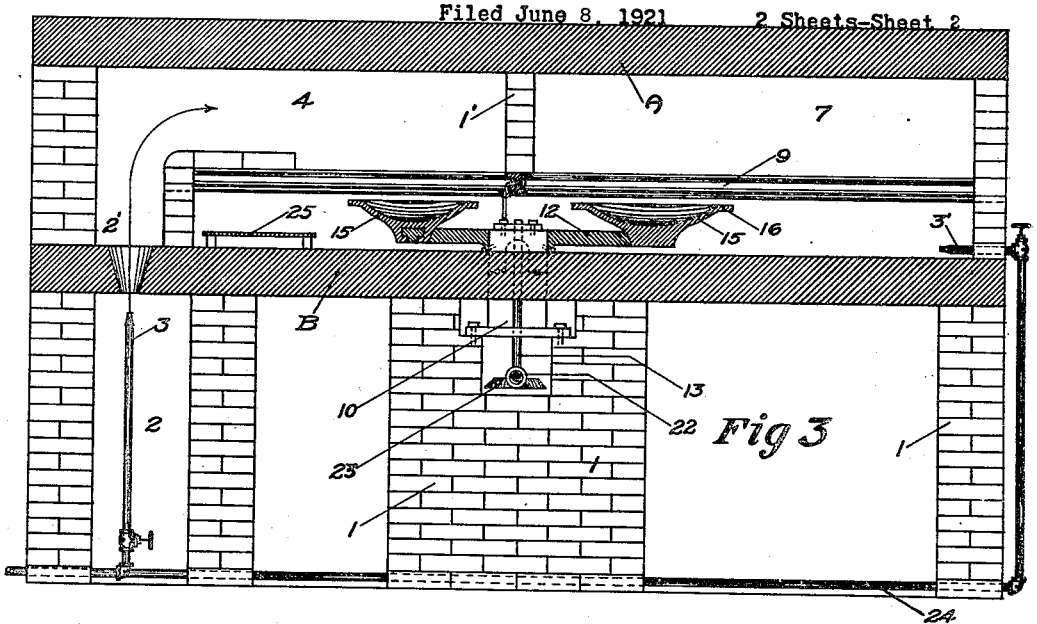
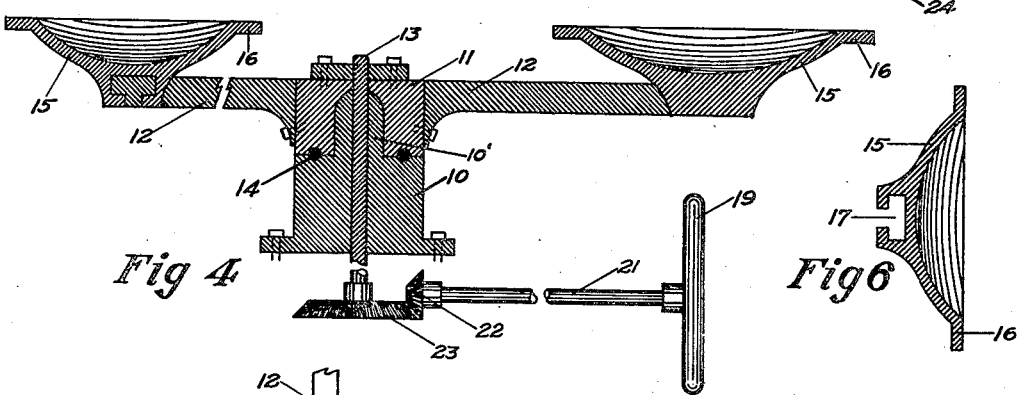
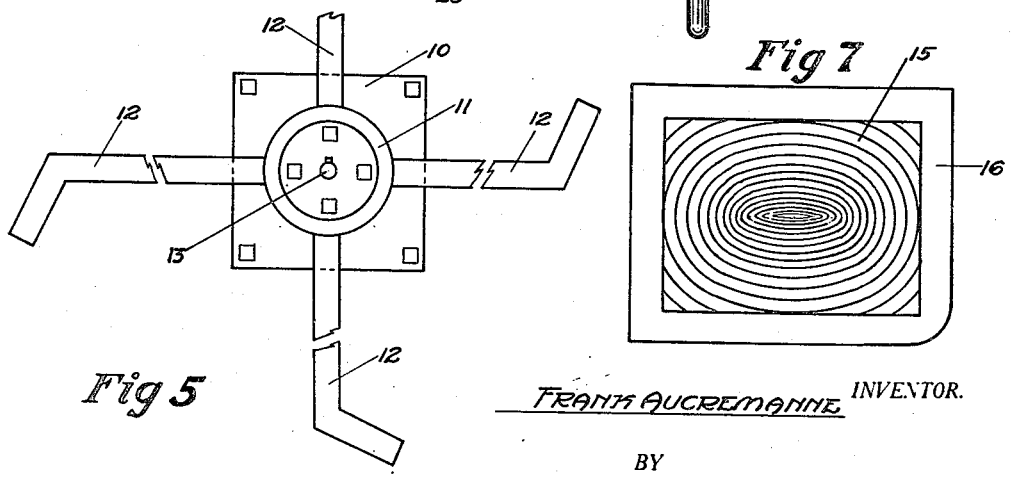
FRANK AUCREMANNE INVENTOR.
BY
G. H. Duthie ATTORNEY.

Patented Apr. 8, 1924.

1,489,729

UNITED STATES PATENT OFFICE.

FRANK AUCREMANNE, OF CLARKSBURG, WEST VIRGINIA.

ROTATING GLASS-MOLDING DEVICE.

Application filed June 8, 1921. Serial No. 475,880.

*To all whom it may concern:*

Be it known that I, FRANK AUCREMANNE, a citizen of the United States, residing in Clarksburg, in the county of Harrison and State of West Virginia, have invented certain new and useful Improvements in Rotating Glass-Molding Devices, of which the following is a full specification.

This invention comprehends new, novel and useful improvements in the means and methods employed for forming convex glass and other shapes, from sheet glass.

The present invention relates more especially to the combination with a four-part heating furnace, a central, rotating mould-carrying device and conveyer connections to annealing oven.

The main object of this invention is the production of a four-part heating furnace, a centrally-located, rotating, mould-carrying device upon the arms of which are attached, moulds, suitable for molding convex glass, or other shapes; and upon which moulds, heated sheet glass may be placed, and, while rotating from one part of the furnace to the other, the glass settles or sinks by gravitation into the mould while passing through each of the four parts of the furnace, without the use of pressure; the sheets of glass are then sufficiently cool to be transferred upon the conveyer and passed through an annealing oven, for annealing purposes.

With this and other objects in view, as will hereinafter be more fully described and claimed, it will be observed that my invention and improved furnace may be constructed of fire brick, metal, asbestos or other combinations of materials; and it is further understood that several changes may be made in the construction of my furnace and rotating glass molding combination, without departing from the spirit and intent thereof; reference being had to the accompanying drawings in which:—

Figure 3, represents a longitudinal section, showing the interior of my combination furnace and rotating molding device along the line 3—3 (see Figure 1).

Figure 4 represents a cross section of the rotating mould-carrying device, and side view of the gear shaft and hand wheel connections.

Figure 5 represents a plan view of the rotating, mould-carrying device, with the moulds removed.

Figure 6 represents a cross section of one of the convex moulds.

Figure 7 represents the upper plan view of a convex mould.

Referring to the drawings: similar numerals and letters refer to similar parts, throughout the several views.

Figure 1:
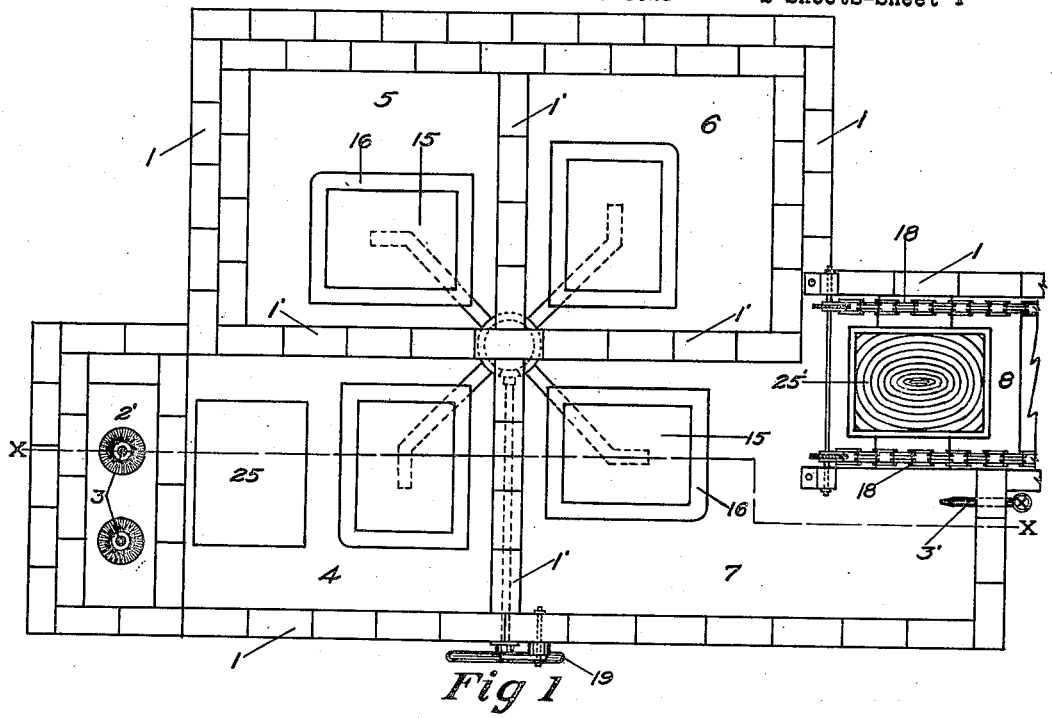
Figure 1, represents a plan view of my furnace combination, with the top or roof removed.
Figure 2:
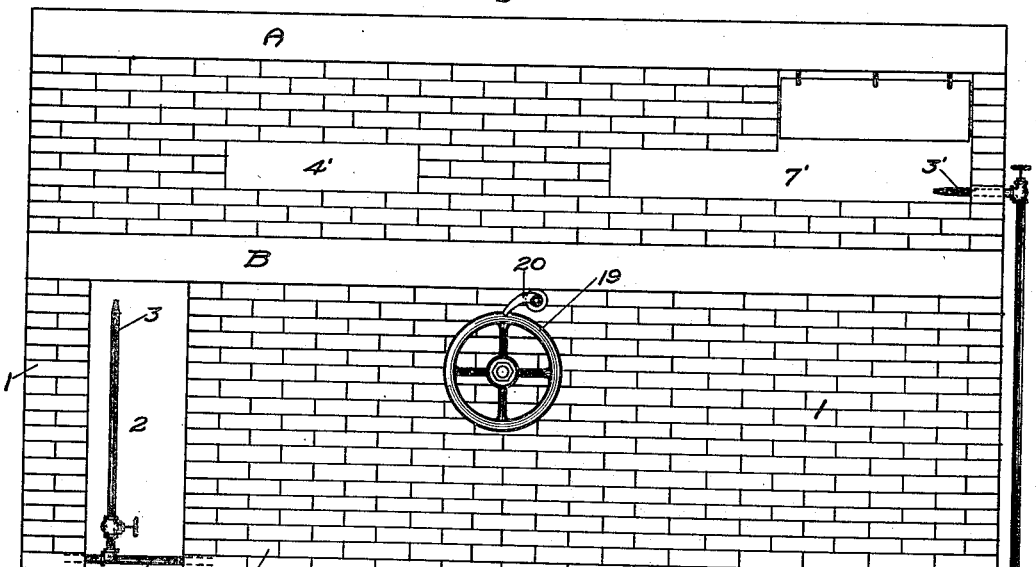
Figure 2 represents a side elevation of said combination furnace.

In the drawings numeral 1 designates the outer fire brick walls of my combination, four-part furnace, erected upon a substantial foundation. Numeral 1' designates the partition walls in the upper portion of said furnace. Numeral 2 designates the air and gas mixing chamber. Numeral 2' designates the combustion chamber, (see Figures 1 and 3). 3 and 3' designate gas jets through which gas is admitted to the front and rear parts of said furnace. 4 designates the first heating chamber of said furnace; 5 the second heating chamber; 6 the third heating chamber, and 7 the fourth heating chamber of said furnace. Numeral 8 designates a conveyer passage-way, between the furnace and annealing oven, not shown in this connection. A and B designate fire clay slabs forming the roof and bottom of my four-part furnace. 9 designates T rails, upon which the partition walls rest. 10 designates the stationary base hub of my rotating, mould-carrying device. 10' designates an extension guide on the upper portion of said hub. 11 designates the upper, rotating hub, adapted to engage and rotate upon, guide 10'. 12 designates the arms, rigidly attached to hub 11. 13 designates a vertical shaft, rigidly attached to the upper, rotating hub. 14 designates ball bearings, between the rotating hub, 11, and the stationary base hub, 10. 15 designates convex moulds, rigidly attached to the outer ends of arms 12, and having an outer flange, 16; all of which constitutes my rotating, mould-carrying device, which is centrally located within said furnace, as shown in Figures 1 and 3. 17 designates the attaching portion of said convex mould, adapted to engage and rest upon the ends of arms 12. 18 designates conveyer chains and connecting rods, adapted to convey moulded glass from the furnace to the annealing oven. 18' designates carrying sprocket wheels, adapted to engage the conveyer chains. 19 designates a hand wheel. 20 designates a ratchet paw, adapted to engage the hand wheel at the notch in the rim thereof. 21 designates a shaft connection between the hand wheel and pinion 22. 23 designates a bevel gear wheel, attached to the lower end of shaft 13. 24 designates the main gas pipe. 25 designates a sheet of glass, being heated in the first part of the heating furnace. 25' designates the same piece of glass after it has been placed on the convex mould, passed through the four-part furnace, changed to a convex shape, and removed to the conveyer. In the operation of my combination furnace, glass-forming device, it will be observed that my rotating, mould-carrying member, is centrally located, within a four part heating furnace, as shown in Figures 1 and 3. The sheet of glass to be formed is first placed upon rest bars, in the first heating chamber 4 (see 25, in Figures 1 and 3). When the sheet of glass reaches a suitable temperature, it is then placed upon the convex mould 15. The hand wheel, 19, is then turned, one complete revolution. This rotates the mould carrying member to the second heating chamber, 5, of the furnace. Then, another sheet is placed in the first chamber, and the same process is repeated and another revolution of the hand wheel, 19, moves the first piece of glass to the third heating chamber, of the furnace. This piece of glass while rotating and resting a few seconds in each heating chamber, will be heated to a temperature sufficient to cause it to completely settle down into the convex-shaped mould, making a perfect convex-shaped piece of glass. After placing another sheet of heated glass upon the mould, in the first heating chamber, the hand wheel is again revolved, one revolution, and the mould in the chamber 6 of the heating furnace, is moved forward to chamber 7, where it rests a few seconds, in a lower temperature of heat. When sufficiently cooled the convex-shaped piece of glass is removed from said mould to the conveyer and conveyed to the annealing oven, followed by other pieces of convex-moulded glass, by repeating the same process.

Having fully described my invention, what I claim as new and desire to secure by Letters Patent, is:—

1. In combination with a four-chamber, glass heating furnace, of the character described, a rotating, glass molding device, having a centrally located, stationary, base hub; a vertical journal guide, upon the upper surface of said hub; a rotating hub member, adapted to pivotally engage the guide journal of the stationary hub, and adapted to rest and rotate upon the upper surface of the stationary hub, by means of ball bearings; a plurality of carrying arms, rigidly attached to the rotating hub, and means for rotating said hub and arms, within the heating chambers, substantially as described.

2. In combination with a four-chamber, glass heating furnace, of the character described; a rotating, glass molding device having a centrally located, stationary, base hub; a vertical journal guide, upon the upper surface of said hub; a rotating hub member, adapted to pivotally engage the guide journal of the stationary hub, and adapted to rest and rotate upon the upper surface of the stationary hub, by means of ball bearings; a plurality of carrying arms, rigidly attached to the rotating hub; a plurality of detachable glass moulds, adapted to slidably engage the outer ends of the rotating arms; said moulds adapted to receive sheets of heated glass, upon their upper surface; and by means of heat and gravitation, the said sheets of glass are formed, to the shape of said glass moulds; and means for rotating said moulds within the heating chambers, substantially as set forth and for the purpose specified.

In testimony whereof I have hereunto set my hand.

FRANK AUCREMANNE.

Witnesses:
 Isa W. Monroe,
 G. H. Duthie.